United States Patent
Piszczek et al.

(10) Patent No.: US 7,877,626 B2
(45) Date of Patent: Jan. 25, 2011

(54) METHOD AND SYSTEM FOR DISK STORAGE DEVICES REBUILD IN A DATA STORAGE SYSTEM

(75) Inventors: Michael Piszczek, Laurel, MD (US); John Gordon Manning, Ellicott City, MD (US); David Fellinger, Westlake Village, CA (US)

(73) Assignee: Datadirect Networks, Inc., Chatsworth, CA (US)

( * ) Notice: Subject to any disclaimer, the term of this patent is extended or adjusted under 35 U.S.C. 154(b) by 437 days.

(21) Appl. No.: 11/967,740

(22) Filed: Dec. 31, 2007

(65) Prior Publication Data

US 2009/0172273 A1 Jul. 2, 2009

(51) Int. Cl.
*G06F 11/07* (2006.01)
(52) U.S. Cl. .................. 714/5; 714/7; 711/114
(58) Field of Classification Search ........ 714/7, 714/5
See application file for complete search history.

(56) References Cited

U.S. PATENT DOCUMENTS

| | | | |
|---|---|---|---|
| 6,453,345 B2 | 9/2002 | Trcka et al. | |
| 7,127,668 B2 | 10/2006 | McBryde et al. | |
| 7,720,812 B1* | 5/2010 | Cierniak et al. | 707/629 |
| 2001/0042222 A1* | 11/2001 | Kedem et al. | 714/6 |
| 2002/0091903 A1* | 7/2002 | Mizuno | 711/154 |
| 2002/0156944 A1* | 10/2002 | Benhase et al. | 710/8 |
| 2002/0180795 A1* | 12/2002 | Wright | 345/772 |
| 2003/0229754 A1* | 12/2003 | Micka et al. | 711/112 |
| 2004/0073747 A1* | 4/2004 | Lu | 711/114 |
| 2004/0078623 A1* | 4/2004 | Totolos, Jr. | 714/4 |
| 2005/0193273 A1* | 9/2005 | Burkey | 714/42 |
| 2006/0026456 A1* | 2/2006 | Kayukawa et al. | 714/5 |
| 2006/0080359 A1* | 4/2006 | Powell et al. | 707/104.1 |
| 2006/0179218 A1* | 8/2006 | Burkey | 711/114 |
| 2006/0212748 A1* | 9/2006 | Mochizuki et al. | 714/6 |
| 2007/0043968 A1* | 2/2007 | Chen | 714/6 |
| 2007/0174657 A1* | 7/2007 | Ahmadian et al. | 714/4 |
| 2007/0283186 A1* | 12/2007 | Madnani et al. | 714/6 |
| 2008/0005507 A1* | 1/2008 | Madnani et al. | 711/161 |
| 2008/0120461 A1* | 5/2008 | Chen | 711/114 |
| 2008/0168218 A1* | 7/2008 | Arakawa et al. | 711/112 |

(Continued)

OTHER PUBLICATIONS

E. Pinheiro, et al., "Failure Trends in a Large Drive Population", Proceedings of the 5th USENIX Conference on File and Storage Technologies, Feb. 2007.

*Primary Examiner*—Scott T Baderman
*Assistant Examiner*—Chae Ko
(74) *Attorney, Agent, or Firm*—Rosenberg, Klein & Lee (57) ABSTRACT

In a data storage system, failed disk drives are switched temporarily off-line to be quickly rebuilt by executing a journaling/rebuild algorithm which tracks the updates to the failed disk drive into a journal structure created in a non-volatile memory. The journal information is used to update those data sections of the disk drive affected by updates after the disk drive is failed. The journal information is stored in bit maps indicating which portions of the disk drive have been updated with new data while the disk was failed. As an option, the system permits verification of data consistency on the data section of the disk drive which have not been affected by the updates. The journaling/rebuild of failed disks is applicable, among others, to RAID data storage systems.

16 Claims, 5 Drawing Sheets

U.S. PATENT DOCUMENTS

| | | | |
|---|---|---|---|
| 2008/0209259 A1* | 8/2008 | Chen | 714/6 |
| 2009/0013213 A1* | 1/2009 | Kalman et al. | 714/20 |
| 2009/0079562 A1* | 3/2009 | Ansiaux et al. | 340/540 |
| 2009/0083504 A1* | 3/2009 | Belluomini et al. | 711/162 |
| 2009/0106327 A1* | 4/2009 | Dilman et al. | 707/202 |
| 2009/0106578 A1* | 4/2009 | Dilman et al. | 714/2 |

* cited by examiner

METHOD AND SYSTEM FOR DISK STORAGE DEVICES REBUILD IN A DATA STORAGE SYSTEM

FIELD OF THE INVENTION

The present invention is directed to data storage systems, and in particular, to restoration of problematic disk storage devices in data storage systems.

More in particular, the present invention is directed to a rapid repair of disk storage devices exhibiting anomalous behavior to avoid a physical replacement thereof, by rebuilding the data sections on disk storage device which are updated (changed) after the disk storage device is indicated as "failed".

The present invention is further directed to a RAID (Random Array of Independent Disks) memory system enhanced with a capability of rapid reconstruction of a failed disk storage device in which updates applied to the failed disk storage device are mapped into a journal structure along with the indicia (address) of data sections affected by the updates, and wherein the affected data sections of the disk storage device are rebuilt using the journal entries in the journal structure.

Additionally, the present invention is directed to a maintenance and upgrade of a data storage system which is designed to repair problematic disk storage devices by rebuilding data sections which need rebuilding and optionally verifying the integrity of data sections on a disk storage device not affected by the rebuild procedure.

BACKGROUND OF THE INVENTION

Computer systems generally employ disk drive devices for storage and retrieval of large amounts of data. Disk drives may degrade and their failure in large storage systems may cause serious problems. Such failures are usually attributed to the defects in the recording media, failure in the mechanics of the disk drive mechanisms, failure in electrical components such as motors and servers, and failure in the electronic devices which are a part of the disk drive units, as well as a number of other attributable causes.

During the normal operation, disk drives may have a number of failure modes which have been identified by the disk drive industry. Some failure modes initially present themselves as an inability to read and/or write data. These are reported to a user or host computer as error codes after a failed command. Some of the errors are the result of medium errors on magnetic disk platters, the surface of which can no longer retain its magnetic state.

Disk drives (disk storage devices) may be temporarily "failed", e.g. switched off-line for several reasons, including error recovery, such as for example a reset, or a power cycle change. A disk storage device may also be failed due to a failure in the communication path such as a cable, small form-factor pluggable (SFP) optical transceiver, or due to an enclosure issue, etc.

The most common type of a drive array is the RAID (Redundant Array of Independent Drives). RAIDs use several inexpensive disk drives with a total cost which is less than the price of a high performance drive to obtain a similar performance with greater security. RAIDs use a combination of mirroring and/or striping for providing greater protection from lost data. For example, in some modifications of the RAID system, data is interleaved in stripe units distributed with parity information across all of the disk drives.

Current RAID systems provide reliable data storage by constructing drive groups with the added data redundancy based upon the RAID level used. For example, RAID-6 system uses a redundancy scheme that may recover from a failure of any two disk drives. The parity scheme in the RAID utilizes either of two dimensional XOR algorithm or a Reed-Solomon code in a P+Q redundancy scheme.

In all RAID systems, the disk drives are deemed either operational or failed by the control system. The failed disk drives are typically flagged for physical replacement. It may happen, however, that the disk drives flagged for replacement, may be repairable.

Modern disk drives are provided with built-in recovery mechanisms which require a rather lengthy system operational time and may need a disk drive controller interaction. Normally, a disk storage system implementing a RAID algorithm, rebuilds all of the data on failed disk storage device. This operation may require, as an average, several hours of the operational time to reconstruct a single disk, and possibly, several days to reconstruct all disks on a failed channel. During this period of time, the data storage system may be susceptible to data loss if remaining disks in the RAID groups become inoperable.

Therefore, there is a need in the industry to avoid unnecessary physical replacement of disks exhibiting anomalous behavior by rebuilding temporarily failed (off-line) disks in a most effective manner to limit the amount of time needed for disk repairment.

SUMMARY OF THE INVENTION

It is therefore an object of the present invention to provide a method for rebuilding temporarily failed (off-line) disk storage devices in a most time-effective manner.

Another object of the present invention is to provide a rebuild algorithm for temporarily failed disk drives in RAID storage systems by tracking updates applied to the failed disk storage device, mapping the updates to the affected data sections in a journal structure, and rebuilding only affected data sections of the disk storage device with the updates executed after the disk storage device was failed.

It is a further object of the present invention to provide a data storage system enhanced with the feature of journaling the updates applied to the failed disk storage device, repairing the data sections affected by the updates, and verifying the integrity of the data sections not affected by the updates.

The present method for "repairment" of a failed disk storage device is preferably implemented in a data storage system including an array of independent disk storage devices (RAID) by providing the system with a journaling unit, a rebuild unit, and optionally, a verify unit. The journaling unit is activated once the disk storage device is failed. The activated journaling unit creates a journal structure in a memory (preferably, a system non-volatile memory), stores in the journal structure a configuration of the disk storage devices in tier parity groups of the RAID system, and tracks updates applied to the failed disk storage device to create in the journal structure a map of data sections of the disk storage device changed by updates applied to the disk storage device after its temporary switching off-line.

The rebuild unit is activated upon the disk storage device is failed to obtain from the journal structure the updates applied to the disk storage device after it was failed, as well as the addresses of the data sections affected by the updates, and to rebuild the affected data sections of the failed disk storage device accordingly.

Optionally, the verify unit is activated upon rebuild of the failed disk storage device has been finished, to verify the data integrity on data sections which were not rebuilt by the rebuild unit and to repair the unrebuild data sections if parity errors have been detected therein.

The journal structure created in the memory is constantly monitored for data integrity. The journal structure is invalidated when an original failed disk storage device is disconnected from the system, or when RAID system algorithm is changed. Additionally, the failure to pass a data integrity check upon powering on of the data storage device causes the journal disablement.

The present invention also constitutes a data storage system enhanced with a capability of time-effective restoration of failed disk storage devices. Such a system includes a journaling unit controlled by the processor unit and bidirectionally coupled to a memory structure to create therein a journal which contains a map of data sections affected by updates applied to the disk storage device after it switched off-line. The system further includes a rebuild unit controlled by the processor unit and operatively coupled to the journal structure to obtain therefrom the journaled information and to repair the affected data sections of the failed disk storage device accordingly.

A verify unit is operatively coupled to the processor unit to detect parity errors, if any, at the data sections on the failed disk storage device which were not affected by the rebuild unit.

The system also includes the mechanism for monitoring the journal structure to invalidate the journal structure at predetermined conditions.

This and other features and advantages of the present invention will become apparent after reading further description of the preferred embodiment in conjunction with accompanying patent drawings.

DESCRIPTION OF THE PREFERRED EMBODIMENT

Figure 1:
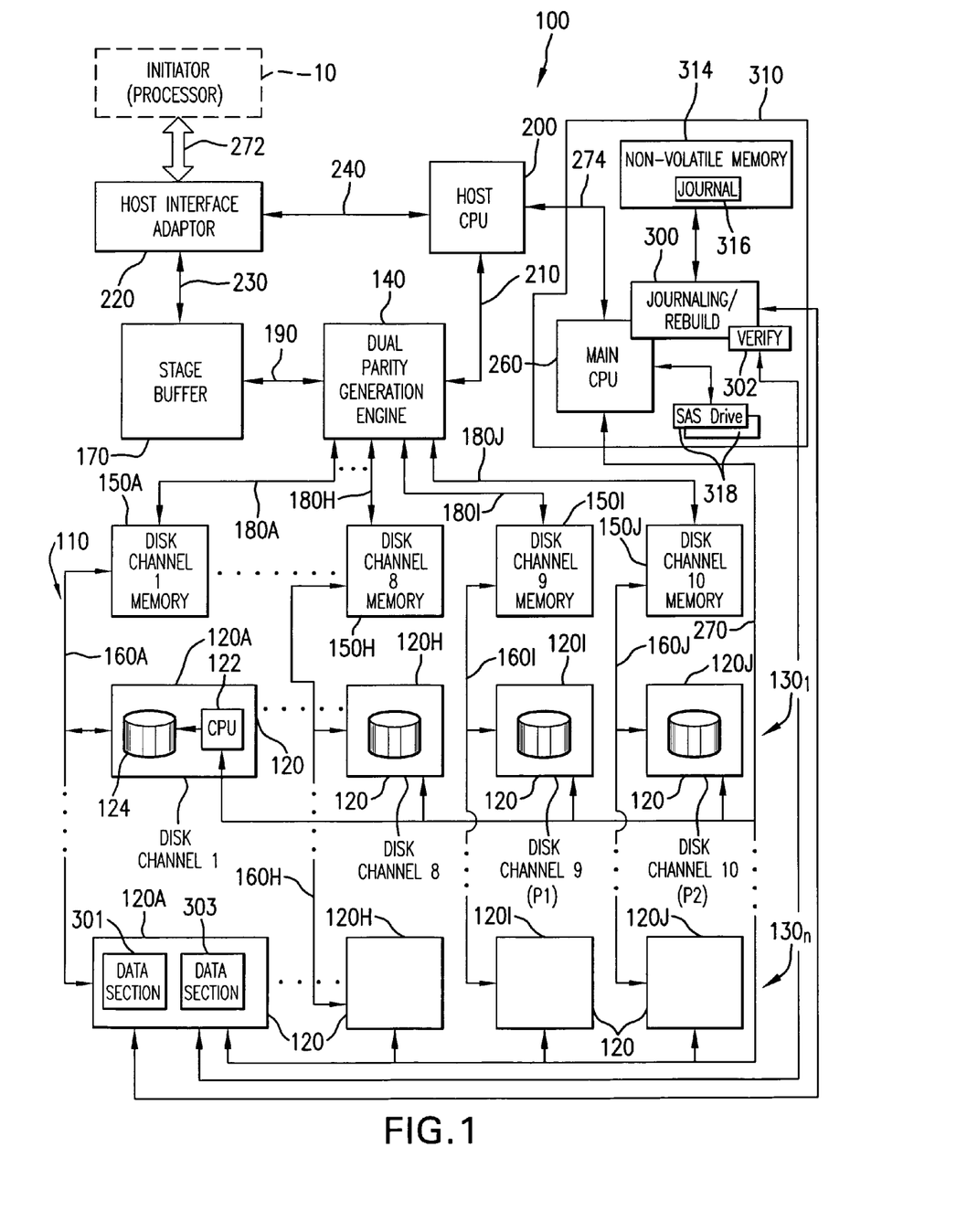
FIG. 1 is a block diagram illustrating the architecture of the data storage system of the present invention.

Referring to FIG. 1, there is shown a data storage system 100 for storing and retrieving data for use by one or more processors (initiators) 10. Although not restricted to any particular redundant array of independent disks (RAID), the capability of the memory system 100 to detect problematic disks is illustrated herein in conjunction with a RAID memory system, for example RAID 3/6, having multi-threaded parallel architecture described in detail in further paragraphs.

Memory system 100 includes a multidimensional array 110 of disk storage devices 120 distributed in read/write tier groups $130_1$-$130_n$ for storing data and parity values corresponding to the data stored in the array. Each tier group $130_1$-$130_n$ in the array 110 constitutes a multiplicity of data disk storage channels 1-8 which in the example illustrated herein, is formed by eight disk drives 120A-120H.

For simplicity, the following description pertains to the tier group $130_1$. However, the principles of design and operation of the tier group $130_1$ are also applicable to all tier groups $130_2$-$130_n$ in the scheme shown in FIG. 1. Data disk storage channels may be formed by a number of disk drives which are being chosen based on such factors as the data capacity for the memory system 100, cost, and reliability requirements.

While in a conventional RAID system check data is stored in two logical parity drives of the system, in actuality, the parity data may be distributed in an interleaved fashion with the striped data across all of the drives of the array. Memory system 100 preferably stripes the data across the plurality of data disk storage channels 1-8, and reserves dedicated parity drives for storing the parity information. Utilizing the dual parity generation engine 140, the memory system 100 provides in each tier group $130_1$-$130_n$ two parity disk storage channels (channels 9 and 10) to provide two physical parity disk storage channels dedicated to parity data storage. As seen in FIG. 1, the array 110 of disk storage devices 120 includes at least two parity disk storage channels 120I and 120J in each tier group $130_1$-$130_n$ for storing check data corresponding to the data stripes stored in the plurality of disk storage drives 120A-120H.

The dual parity generation engine 140 may be a processor which implements a dual parity RAID software algorithm. The RAID algorithm is one of a conventional RAID type process such as a two-dimensional XOR algorithm or a Reed-Solomon P+Q algorithm having the ability to detect a failure of two of the plurality of disk storage channels 120A-120J. The dual parity generation engine may also be provided as hardware implementation of the particular dual parity RAID algorithm being utilized. Although the particular implementation of the dual parity generation engine and the dual parity RAID algorithm are not important to the inventive concepts, as herein described, a field programmable gate array implementing a two-dimensional XOR algorithm has been successfully utilized to implement the dual parity generation engine in one working embodiment of the present invention.

Each of the disk storage devices 120 includes a control central processing unit (CPU) 122 for controlling the operation of the disk storage media 124, which for simplicity of description are representatively shown only for the disk storage channel 120A of the tier group $130_1$ and for the corresponding disk storage channel 120A of the tier group $130_n$. Each of the disk storage channels 120A-120J of each tier group is coupled to a respective disk channel memory 150A-150J through a corresponding data bus 160A-160J. Each of the disk channel memories 150A-150J acts as a data cache for data being read from and written to the corresponding disk storage devices 120.

The disk channel memories 150A-150J may be separate and distinct dual port memories, or a single dual port memory which is divided into a plurality of subunits corresponding to the data strips for each of the disk storage channels. As may be seen in FIG. 1, the corresponding disk storage channels 120A-120J in the tier groups $130_1$-$130_n$ may share the respective disk channel memory 150A-150J. For example, the disk channel memory 150A is shared by the channels 120A in the tiers $130_1$-$130_n$ through the common data bus 160A.

The data read into the plurality of disk channel memories 150A-150J is read by a dual parity generation engine 140 and processed to determine the validity of the data. The data is further transferred to a stage buffer 170. The data read from the plurality of disk channel memories 150A-150J is transferred to the dual parity generation engine 140 by means of a corresponding data bus 180A-180J. The data transferred on each data bus 180A-180J includes the corresponding data read from the disk storage channels 120A-120J, plus additional parity bits added to enable detection of transmission errors between the disk channel memories 150A-150J and the dual parity generation engine 140.

The dual parity generation engine 140 transfers the data to the stage buffer 170 through a data bus 190 controlled and monitored by a host CPU 200 through a bus 210. Stage buffer 170 is a dual port memory which provides validated data to a host interface adaptor 220 through a direct memory access (DMA) bus 230. Host interface adaptor 220 under control of the host CPU 200, through the host interface control bus 240, provides the data read from the stage buffer 170 to the processor 10 through an interface bus 250.

Host interface adaptor 220 provides the bus conversion between the DMA bus 230 and the interface bus 250. Interface bus 250 may be a peripheral component interconnect (PCI) bus, a peripheral component interconnect extended (PCI-X) bus, a peripheral component interconnect express (PCIe) bus, a hyper transport (HTX) bus, or any other internal high speed communication bus appropriate for interfacing memory system 100 with one or more processors 10. Where memory system 100 is an external peripheral to a computer system or network, interface bus 250 may be a distributed bus such as Ethernet or fibre channel, or other high speed distributed bus architecture.

Main CPU 260 monitors and controls the operation of the plurality of disk storage channels 120A-120J of all the tier groups $130_1$-$130_n$ through disk control bus 270. As representatively shown with respect to disk storage channel 120A of the tier groups $130_1$-$130_n$, the main CPU 260 communicates with a CPU 122 of each respective disk storage device 120, in order to control the read and write operations from and to the disk storage media 124 of the respective disk storage device and monitor the status thereof. Main CPU 260 communicates with the host CPU 200 through the CPU control and communications bus 274, signaling the host CPU 200 when the read or write operations of the disk storage channels has been completed. Host CPU 200 controls the dual parity generation engine 140 through the bus 210 to test and transfer data from the plurality of disk channel memories 150A-150J to the stage buffer 170. After a transfer of valid data has been completed, the host CPU 200 instructs the host interface adaptor 220 to transfer the data from the stage buffer 170 to the initiator (processor) 10.

If the transfer status returned by the dual parity generation engine 140 to the host CPU 200 indicates that the data is invalid, host CPU 200 begins the error recovery procedure which retries the original transfer from the plurality of disk channel memories 150A-150J through the dual parity generation engine 140 to the stage buffer 170. This retry of the transfer may repair most soft data errors and soft bus parity errors. If the retry does not produce valid data, the processor determines whether the disk storage channel in error is known, such as when there is a bus parity error, an identified defective disk storage device 120, or a disk storage device having known bad data which may occur when a new drive has been placed on-line which has not yet had its data rebuilt. When the disk storage channel in error is unknown, conventional RAID systems are only able to confirm that the data is not valid. In order to overcome that deficiency, host CPU 260 may include an auto-correction algorithm for instructing the dual parity generation engine to perform further tests on the data to try to identify the disk storage channel in error.

To further improve the performance, the system 100 is provided with the capability to detect problematic elements of the storage system, such as problematic disk drives, so that the disk drives (disk storage devices) exhibiting anomalous behavior may be switched temporarily off-line (failed) for rebuild thereof in a time-effective manner to prevent the problematic disks from degrading the overall performance and reliability of the entire storage system.

Repairment of problematic disks in the storage system 100 of the present invention is facilitated by the journaling/rebuild unit 300 preferably residing in the main CPU 260, as shown in FIG. 1. The unit 300 alternatively may be implemented as a separate unit operatively coupled to the main CPU 260. The journaling/rebuild unit 300 of the system 100 of the present invention also contains a verify unit 302 as will be described in detail in further paragraphs.

In general terms, the journaling/rebuild unit (algorithm) 300 is activated when a disk storage device 120 is failed. Upon activation, the journaling/rebuild unit creates a journal structure in a memory (as will be disclosed in detail in further paragraphs) in which all updates applied to the failed disk storage device are recorded and mapped to data sections of the disk storage device affected by the updates. The journaled information is further used by the rebuild phase of the journaling/rebuild algorithm 300 to rebuild the affected data sections 301 of the disk storage device, as shown in FIG. 1, with the updates entered into the journal structure. When the failed disk storage device is "repaired", the verify algorithm 302 may be activated to check the data sections 303 (which were not rebuilt by the journaling/rebuild algorithm 300) for possible parity errors.

The data storage system 100 includes a main CPU board 310 which is the General I/O and Cache Controlling processing element for the Silicon Storage Appliance. The main CPU 260 manages the operation of the entire system. The main CPU board 310 includes a high-speed non-volatile memory 314 for storing the journaling information in a journal structure 316 and metadata for the cache. This allows the system to preserve the state of the cache data and journals through a power failure. In the event of a power failure, the system may retrieve this information and begin self correcting operations after the power is restored.

The main CPU board 310 accommodates two Serial Attached SCSI (SAS) ports capable of supporting 2 SAS drives 318. These disk drives provide backup storage for the journaling information in memory 314 in the event of a power-down situation. The SAS ports are also connected to SAS drives in both units to provide full fault tolerance. In the event of a unit failure, the other unit in the couplet is capable of retrieving the journaling information from the SAS drives on another unit.

To implement the journaling/rebuild algorithm 300, the system 100 of the present invention uses the memory 314, preferably a nonvolatile memory, for storing the journal information in the journal structure 316. The journaling/rebuild unit 300 stores the configuration of the disk storage devices in each tier parity group in the journal structure 316 created in the memory 314. This information includes the serial number of each disk storage device, as well as the RAID algorithm in use on the tier parity group. The journal information is stored in the journal structure 316 in bitmaps which indicate the data sections 301 on the disk storage device which have been updated (affected) with new data (updates) while the disk storage device remains failed.

The journal structure 316 has a predetermined granularity, for example of the size 4 MB. This granularity is an adjustable parameter which may be changed when needed in each particular application. A single update, e.g. host write, thus may cause the system to rebuild a minimum of the granularity unit of data on the disk. A new host writes into a data section of the size 4 MB that has already been journaled in the journal structure 316 will not cause a new journal entry. The system 100 will automatically update journals (journal structures) 316 when disks are failed or replaced regardless of whether journaling is enabled.

Figure 2:
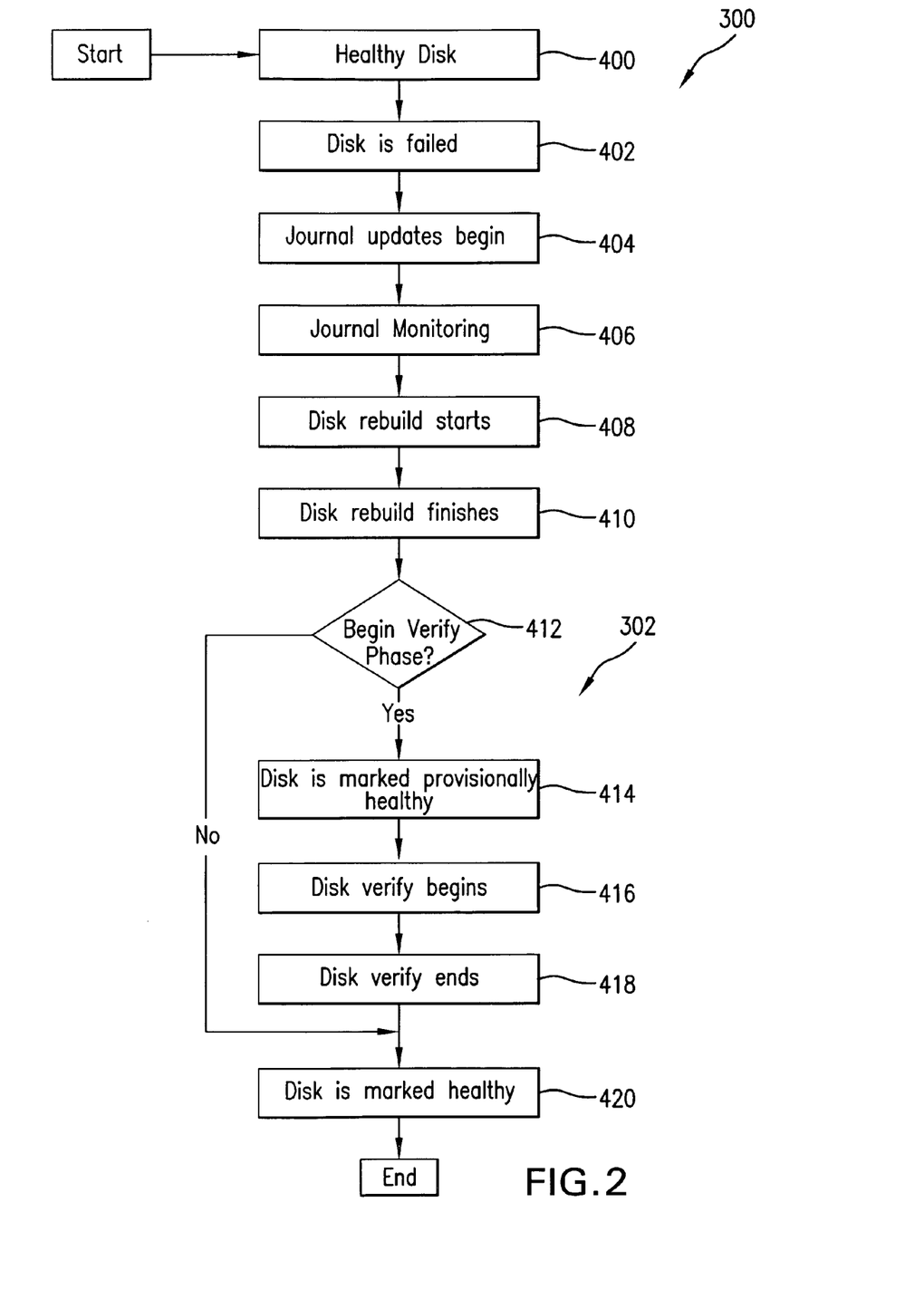
FIG. 2 is a flow chart diagram of the process for "repairment" of the failed disk storage devices in accordance with the present invention.

Referring to FIG. 2 illustrating a flow chart diagram of the journaling/rebuild process 300, including the verify phase 302, the procedure starts at block 400 "Healthy Disk" in which system analyzes the disks behavior, and assumes the disk is healthy until the disk is exhibiting anomalous behavior. When such a disk storage device is detected, the system moves to block 402 "Disk is Failed" in which the disk is temporarily switched off-line (failed).

When a disk is failed, the flow chart passes to the block 404 "Journal Updates Begin" in which the algorithm 300 activates the journaling subrouting and begins tracking all possible updates to the disk in the journal structure which is created in the memory. This is done to create and retain in the memory a map of the updates applied to the disk storage device after it is failed. Such a map also represents a bit map in the memory that determines which data sections of the disk drive have changed while the disk drive is off-line. The memory in which the journal structure is created by the algorithm 300 may be a nonvolatile memory the system specifically allocated for this purpose. Alternatively, the journal may be created in a nonvolatile memory of the main CPU.

An update to the disk storage device occurs when a new disk command is sent to the disks which may contain write data from an initiator (processor) 10 shown in FIG. 1, or when a previous disk command is being executed which contains "write" data from the initiator. Additionally, the update occurs when a cache coherency request for a "write" of the initiator data is received from an alternate storage controller, or when a journal coherency request is received from an alternate storage controller which indicates that a journal structure update is required. Each time when an update to the failed disk storage device is applied thereto, the journal structure needs to update the journal entry associated with the data section affected by the latest update.

When a rebuild operation is requested, the algorithm 300 starts the rebuild subroutine by determining if the journal structure may be used. The journal information must pass integrity tests which determine if the information of the journal structure is valid. To ensure that the journal structure is correct, the logic flows to block 406 "Journal Monitoring" where the system carefully monitors the state of the journal structure and automatically invalidates (or disables) the journal structure if it detects a condition where the journal structure cannot be used or journal information could potentially be lost. The journal structure may be invalidated in several cases, e.g., (a) when the disk is changed or is disconnected from the system for any reason, (b) the RAID algorithm in use on the tier parity group is changed, or (c) the journal information fails to pass an integrity check when the system is powered up.

Figure 3:
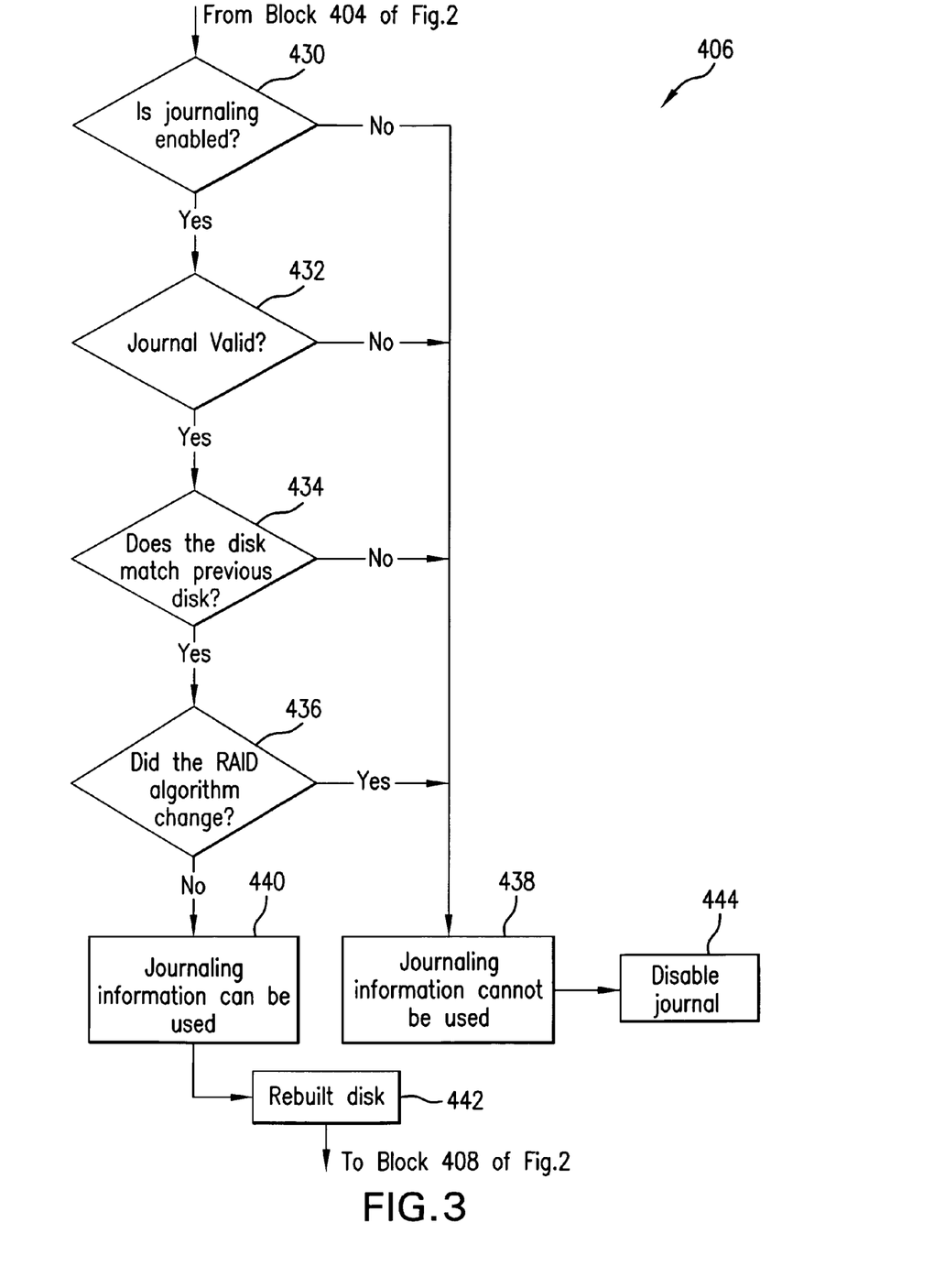
FIG. 3 is a flow-chart diagram of the subroutine for monitoring the journal structure.

Referring to FIG. 3, representing a flow chart diagram of the journal monitoring subroutine, the procedure starts in block 430 "Is Journaling Enabled?". In block 430, a system administrator may turn off or turn on the journaling enabling feature. If the journaling phase is not enabled the logic flows to block 438 "Journaling Information Cannot Be Used", and the journal is disabled in block 444. If, however, the journaling feature is enabled, the flow chart passes to block 432 "Journal Valid?" in which the algorithm 300 performs consistency checks on the journal structure to verify that the information which is stored therein is valid and is not corrupted. For example, in block 432 the system may perform a Cyclic Redundancy Check (CRC). If, as a result of the consistency checks in block 432, an error is detected, the logic flows to block 438 to manifest that the journaling information is corrupted and cannot be used for rebuilding the disk storage device.

If, however, the journal structure passes the consistency check in block 432, the flow-chart moves to block 434 "Does the Disk Match Previous Disk?". The system of the present invention is designed to guarantee that the repair process is applied exclusively to the original failed disk the structure and updates of which are tracked into the journal. Therefore, if an operator of the system accidentally disconnects the original disk or replaces the original failed disk with another one, the logic flows to block 438 to disable the journaling procedure. If, however, the system determines that the disk in question is the original failed disk, the flow chart passes to block 436 "Did the RAID Algorithm Change?".

In block 436, the algorithm 300 operates to provide that the algorithm underlying the current RAID system architecture for the rebuild phase of the process is the same as the RAID algorithm used in the journaling phase of the present process. For example, the system of the present invention may be supported by RAID-3 system algorithm or RAID-6 system algorithm. It is important to use the right RAID algorithm as the data integrity depends on it. The algorithm 300 performs a check in block 436 whether the RAID system type algorithm in use has not been switched between the journaling phase and rebuild phase. If a switch between the RAID algorithm in use is detected in block 436, the logic flows to block 438 for disabling journaling information. If, however, no RAID algorithm change has been detected in block 436, the flow chart moves to block 440 "Journaling Information Can Be Used". The system now may use the journaling information from the journal structure to rebuild disk in block 442.

Referring again to FIG. 2, once the system has verified in block 406 that the journal information may be used, a disk rebuild is requested, and the logic flows from block 406 to block 408 "Disk Rebuild Starts". In the disk rebuild phase, the algorithm 300 rebuilds only those disk data sections 301 which are affected by the updates after the disk is failed. The rebuild phase conducted in block 408 of FIG. 2, is shown in detail in FIG. 4. In the rebuild phase shown in FIG. 4, upon determining that the information in the journal structure is valid, the rebuild phase begins in block 450 "Search for Next Data Section to Rebuild" in which the system, by using the journal information, allocates the first data block on the disk affected by the update.

Figure 4:
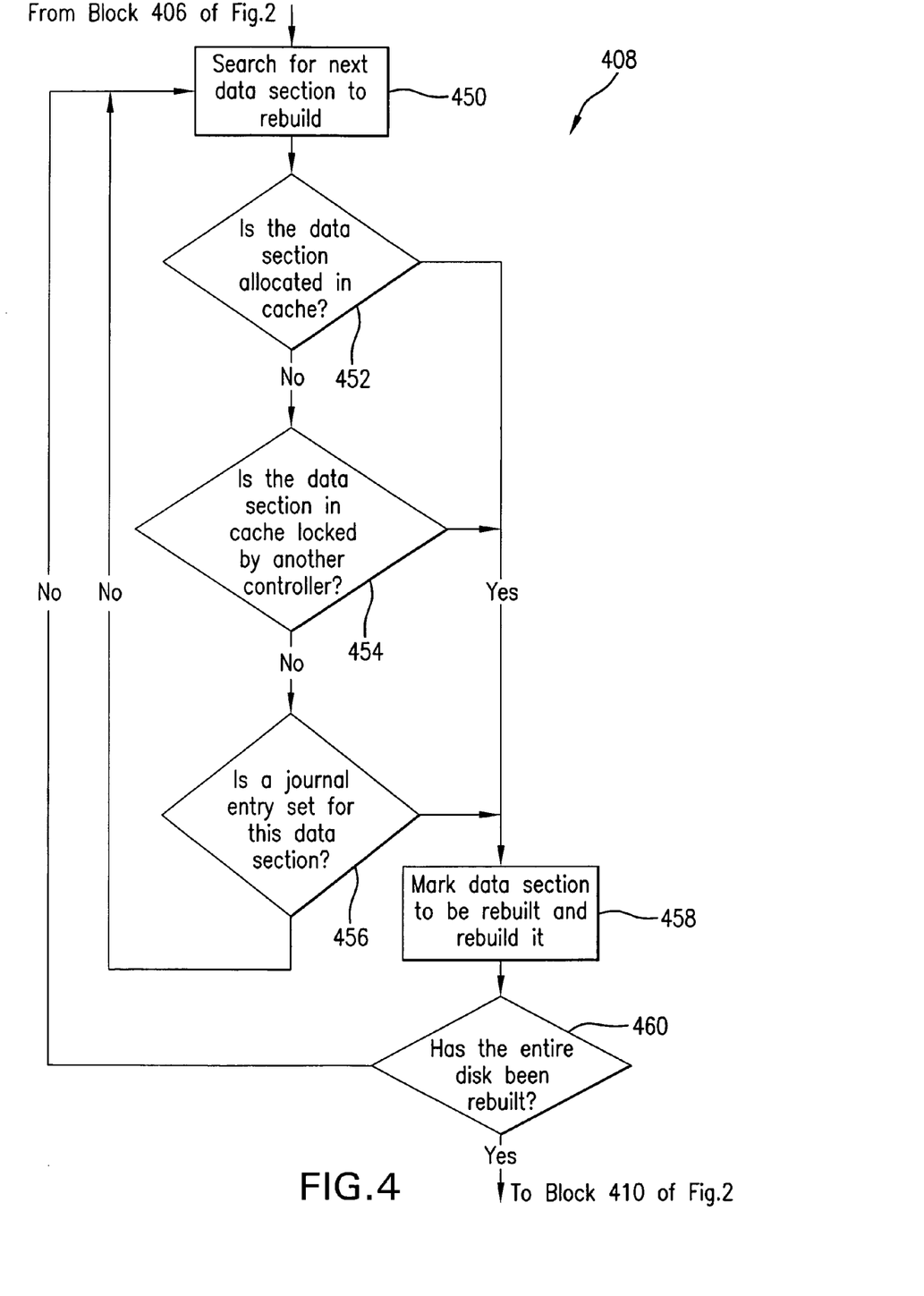
FIG. 4 is flow-chart diagram of the rebuild subroutine of the process of the present invention.

Further, the system makes a determination of what data needs to be rebuilt. For this the system flows to logical block 452 "Is the Data Section Allocated in the Cache?". In order to perform a direct rebuild, the system does not rely solely on the journal structure information, but also verifies this information with other possible sources thereof, such as for example cache memory and memories of other disk storage devices. For this purpose the system, in addition to using the journal structure information, communicates with other controllers in the system to share data for a successful rebuild operation. If in block 452, the data section allocated in the cache coincides with the data section found in block 450, the logic flows to block 458 "Mark Data Section to be Rebuilt and Rebuild it" to prepare the system for making updates to the section identified in block 450.

If, however, in block 452, the consistency between the data section found in block 450 was not found with the cache memory, the logic flows to block 454 "Is the Data Section in Cache Locked by Another Controller?". As it is known to those skilled in the art, there are several different types of data descriptors that exist in the cache memory of the system to represent the data. They may include a real cache descriptor which actually has memory address associated with it and has real data associated with it. Another type of descriptor, e.g. a dual descriptor, has information that some other unit in the system actually uses the data. In this situation, the data section in question (which was found in block 450) is considered "locked" by another controller using it for its related operations. Therefore, if in block 454 the data section found in block 450 is used by another controller, the logic flows to block 458. If, however, in block 454 the data section found in block 450 is not found to be "locked" by another controller, the logic moves to block 456 "Is a Journal Entry Set for This Data Section?". If this is the case, the flow chart passes to block 458 to mark the data section in question to be rebuilt. If, however, the data section does not have a journal entry associated therewith, the logic returns to block 450 to search for a next data section for rebuild operation.

In block 458, the system builds a list of Logical Unit Numbers (LUN) representing data sections that exist on the disk and begins rebuilding each LUN in the order in which they are physically located on the disk. For each LUN, the rebuild operation initiates a journal update for the first and last journal entries for the LUN. This eliminates timing issues associated with journal coherency between the controllers by forcing a rebuild of the first and last blocks of the LUN. In the RAID system 100, the LUN may be considered not only as a real data section, but also as virtual portion (or volume) of an RAID disk drive. The logic checks whether all data sections on the disk storage device have been rebuilt. For this the logic flows from block 458 to block 460 "Has the Entire Disk Been Rebuilt?". If there are more data sections to be rebuilt, the flow chart loops from block 460 to block 450 to search for next data section to be rebuilt. If, however, all data sections on the disk have been rebuilt, the flow chart passes to block 410 of FIG. 2 "Disk Rebuilt Finishes" in which the journal updates end and disk is provisionally marked as healthy disk. At this point the journaling/rebuild algorithm 300 may be considered to fulfill its function.

However, optionally, the system 100 may perform an additional verify operation underlined by the verify algorithm 302 which starts at block 412 "Begin Verify Phase?" of FIG. 2. If the system administrator rejects this feature, the logic flows to block 420 "Disk is Marked Healthy" in which the journal is cleared and rebuild procedure is considered successfully accomplished. If, however, in block 412, the verify feature is selected, the logic flows to block 414 where the disk is marked provisionally healthy and the verify phase begins in block 416 "Disk Verify Begins" to verify data integrity in the un-rebuilt data sections 303 on the disk. The verify operation checks the unset entries in the journal structure to determine those data sections 303 on the disk which have not been affected by the updates and therefore have not been rebuilt in the rebuilt subroutine. These "un-rebuilt" data sections 303 are to be verified in the verify subroutine (phase) 302. If any array parity errors are detected during the verify phase, they are automatically "repaired".

Figure 5:
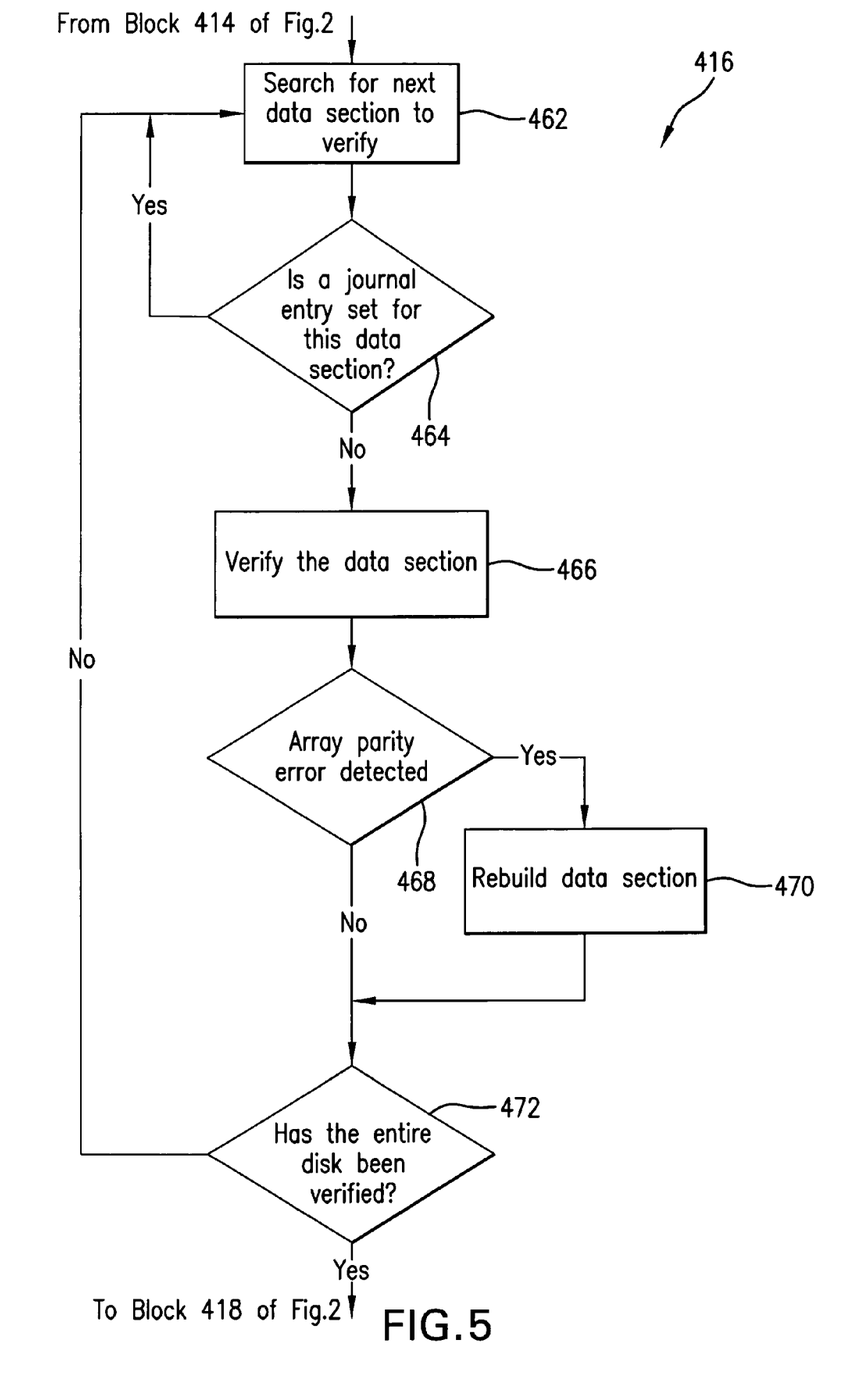
FIG. 5 is a flow chart diagram of the verify phase of the process of the present invention.

The verify subroutine is shown in FIG. 5, wherein the subroutine starts in block 462 "Search for Next Data Section to Verify". In block 462 the system searches for the data section on the disk storage device unaffected by updates starting from the physical beginning of the disk. When such a data section is found in block 462, the logic flows to block 464 "Is a Journal Entry Set for This Data Section?". If this is the case, meaning that the data section in question was rebuilt in the previous rebuild phase, the logic loops to block 462 to search for next data section since data section found in block 462 is the data section 301 affected by updates. If, however, the data section found in block 462 does not match a journal entry associated therewith, the flow chart passes to block 466 "Verify the Data Section" and the algorithm checks whether this data section manifests a parity error. In block 468 "Array Parity Error Detected?" system judges whether any abnormalities have been found during the verification of the data section in block 466. If a data inconsistency was detected in block 468, the logic flows to block 470 "Rebuild Data Section" to repair the data section in question. If, however, in block 468 no parity errors have been detected, the logic flows to block 472 to find out whether the entire disk has been verified. If this is the case, the procedure is accomplished, and logic flows to block 420 of FIG. 2. If, however, there are still data sections on the disk to be verified, the logic loops from block 472 to block 462 to find another data section for verification.

Referring again to FIG. 2, when disk verification ends in block 418, the logic flows to block 420 where the disk in question is marked healthy and journal is cleared to be prepared for journaling and rebuilding of another failed disk storage device.

As clear from the previous description, the verify operation checks the unset entries in the journal structure to determine what data sections of the disk need to be verified. If any array parity errors are detected during this phase, they are automatically rebuilt. The disk is marked as fully healthy after the verify operation completes. The verify phase may take several hours or days to complete but there is a guarantee that the data on the disks is valid.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A method for disk storage device rebuild in a data storage system including disk storage devices grouped in at least one tier parity group, a processor unit operatively coupled to said disk storage devices, a memory structure operatively coupled to said disk storage devices, and a parity engine coupled to said disk storage devices, the method comprising the steps of:

operatively coupling a journaling unit and a rebuild unit to said processor unit;

detecting a failed condition of at least one disk storage device and identifying said at least one storage device as failed, said at least one disk storage device containing a plurality of data sections residing thereon;

taking said at least one storage device identified as failed off-line;

activating said journaling unit responsive to said at least one disk storage device being identified as failed, said journal unit performing the steps of:

creating a journal structure in said memory structure, storing in said journal structure a configuration of the disk storage devices in said at least one tier parity group, tracking updates applied to said at least one disk storage device subsequent to being identified as failed, said updates being intended for application to respective first data sections thereof, mapping in said journal structure said updates to said respective first data sections; and activating said rebuild unit to rebuild said respective first data sections mapped in said journal structure responsive to said at least one storage device being brought back on-line, said at least one disk storage device having second data sections ignored by said rebuild unit to thereby reduce a time period required to return said at least one storage device to an operational status.

2. The method of claim 1, wherein the step of mapping in said journal structure includes the step of creating a journal entry to said journal structure for each of said updates, said journal entry being indicative of each said update and an address of a respective one of said first data sections affected by each said update.

3. The method of claim 1, wherein the step of activating said rebuild unit includes the steps of reading each said update from said journaling structure; and applying each said update to a corresponding one of said respective first data sections.

4. The method of claim 1, wherein the step of activating said rebuild unit includes the steps of:
building a list of Logical Unit Numbers (LUNs) for said first data sections existing on said at least one disk, each LUN having a first and a last journal entry;
checking the status of said first data sections of each LUN on said list of LUNs; and
rebuilding each LUN in an order corresponding to a location thereof on said at least one disk by initiating a respective journal update for said first and said last journal entries for said LUN.

5. The method of claim 1, subsequent to completion of said step of activating said rebuild unit, marking said at least one disk storage device as being healthy.

6. The method of claim 1, further comprising the steps of:
operatively coupling a verify unit to said processor unit, and
actuating said verify unit to verify data integrity of said second data sections on said at least one disk responsive to completion of said step of activating said rebuild unit.

7. The method of claim 6, further comprising the steps of:
rebuilding said second data sections if parity errors are detected, and
marking said at least one disk healthy.

8. The method of claim 1, wherein the step of storing a configuration of the disk storage devices includes the step of storing in said journal structure an identifying indicia of each disk storage device and a Random Array of Independent Disks (RAID) algorithm in use.

9. The method of claim 8, wherein the step of creating a journal structure in said memory structure is followed by the steps of:
monitoring said journal structure; and
invalidating said journal structure responsive to detecting one of replacement of said at least one disk storage device with another disk storage device, changing said RAID algorithm in use, and failure of said journal structure to pass a data integrity check.

10. The method of claim 2, wherein the step of activating said rebuild unit includes the step of verifying if said journal entry corresponding to said respective one of the first data sections is allocated in a cache prior to rebuilding said respective one of the first data sections.

11. The method of claim 10, wherein the step of activating said rebuild unit includes the step of verifying if said journal entry is used by an alternative processor prior to rebuilding said respective one of the first data sections.

12. The method of claim 11, the step of activating said rebuild unit includes the step of verifying if said journal entry is established for said one of the first data sections prior to rebuilding said respective one of the first data sections.

13. A data storage system with enhanced rebuild of failed disk storage devices, comprising:
a plurality of independent disk storage devices distributed in at least one tier parity group, responsive to at least one of said independent disk storage devices being identified as a failed disk storage device, said failed disk storage device being switched off-line and subsequently switched back on-line;
a processor unit operatively coupled to each of said plurality of independent disk storage devices;
a memory structure coupled to said processor unit;
a journaling unit operatively coupled to said processor unit and said memory structure;
a journal structure residing in said memory structure, said journaling unit storing an identification of each of said plurality of independent disk storage devices distributed in said at least one tier parity group in said journal structure, said journaling unit mapping data for updated data sections of said failed disk storage device in said journal structure responsive to said at least one of said independent disk storage devices being identified as said failed disk storage device, and
a rebuild unit operatively coupled to said processor unit and said journal structure, said rebuild unit rebuilding only said updated data sections on said failed disk storage device with said mapped data residing in said journal structure responsive to failed disk storage device being switched back on-line.

14. The data storage system of claim 13, further comprising a verify unit operatively coupled to said processor unit to verify data integrity on non-updated data sections of said failed disk storage device subsequent to rebuilding of said updated data sections of said failed disk storage device.

15. The data storage system of claim 13, further comprising a journal structure monitoring unit coupled to said journal structure for invalidating said journal structure responsive to one of said failed disk being replaced by another disk storage device, a Random Array of Independent Disks (RAID) algorithm in use when said at least one of said independent disk storage devices was identified as said failed disk storage device being changed, and failure of said journal structure to pass a data integrity check.

16. The data storage system of claim 13, further comprising a main CPU board containing said main CPU, said non-volatile memory structure, and SAS (Serial Attached SCSI) drives for backup storage of said journal structure.

* * * * *